Aug. 11, 1953  W. E. RANEY  2,648,238
TOOL ACTUATING MECHANISM AND CONTROL UNIT THEREFOR
Filed April 19, 1949  3 Sheets-Sheet 1

INVENTOR.
WILLIAM E. RANEY
BY
Oberlin & Limbach
ATTORNEYS.

INVENTOR.
WILLIAM E. RANEY
BY
Oberlin + Limbach
ATTORNEYS.

Aug. 11, 1953 W. E. RANEY 2,648,238
TOOL ACTUATING MECHANISM AND CONTROL UNIT THEREFOR
Filed April 19, 1949 3 Sheets-Sheet 3

INVENTOR.
WILLIAM E. RANEY
BY
Oberlin + Limbach
ATTORNEYS.

Patented Aug. 11, 1953

2,648,238

UNITED STATES PATENT OFFICE 2,648,238

TOOL ACTUATING MECHANISM AND
CONTROL UNIT THEREFOR

William E. Raney, Lakewood, Ohio

Application April 19, 1949, Serial No. 88,456

16 Claims. (Cl. 77—33.5)

1

The present invention relates generally as indicated to tool actuating mechanisms and control units therefor and more particularly to certain improvements in mechanism of the character disclosed in my Patent No. 2,355,558, dated August 8, 1944, in which the rotary and axially reciprocable tool carrying shaft thereof constitutes the rotor or secondary winding of an electric motor thereby achieving the following enumerated and other advantages of a direct electric drive for the tool mounted on said drive shaft.

In the aforesaid patent construction the solenoid effect between the stator and rotor of the electric drive motor or, in other words, the influence of the magnetic field generated in the motor on the rotor is employed to effect the retractive or outfeed movement of the drive shaft to a neutral axial position with the rotor centered with respect to the stator. One advantage of so utilizing the solenoid effect on the rotor is that upon release of the in-feed producing force, the retractive force becomes immediately operative to commence the out-feed movement. Other advantages of such a direct drive are:

(1) Because the tool is carried directly on the reciprocable electric motor drive shaft there are no transverse or lateral forces imposed on said shaft tending to cock the shaft as would be the case where worm gearing, pulleys, or like means are employed to transmit power from a power device to a rotary drive shaft, and (2) Because there is an automatic reduction in the speed of rotation of the drive shaft in accordance with the depth of the cut, drilling and like operations can be performed without overheating of the tool point.

Still another advantage is that the offset between the drive shaft axis and the mounting block of the mechanism is reduced to a minimum and moreover guideways and the like are not required inasmuch as the rotor of the motor and drive shaft thereof are arranged to move axially relative to the housing thereabout.

In contradistinction to the aforesaid patent construction it is proposed in the present case to axially reciprocate the rotor and drive shaft of an electric motor from one side to the other of the neutral position to which the magnetic field generated in the motor tends to draw the rotor whereby to materially increase the length of the operating stroke of the mechanism. It is further proposed to utilize the influence of the magnetic field (alternately aiding and opposing the reciprocation of the rotor between such positions) in

2 conjunction with control units in a manner to achieve an improved accurate control in the reciprocation of the drive shaft both with respect to the speeds of in-feed and out-feed movements thereof and the limit of the in-feed movement.

Accordingly, it is one primary object of this invention to provide an apparatus of the character indicated in which the drive shaft in-feed and out-feed movements may be desirably adjusted to avoid shock upon initial engagement of a tool on said shaft with a workpiece and to accomplish feeding of the tool at a predetermined rate of speed and with a predetermined force so regulated that, upon a sudden decrease in the resistance to the feeding of the tool, as for example, when a drill breaks through a workpiece, the formation of burrs and jagged edges on the workpiece are minimized.

Another object is to provide an apparatus having unique means for accurately adjusting the stroke of the drive shaft and accurately controlling the point at which the movement of said shaft is interrupted.

Another object is to provide an automatic sequence control of the tool rotating and feeding apparatus relative to an indexing device on which a workpiece or workpieces are adapted to be supported, to thus enable continuous operation requiring the operator only to load and unload workpieces.

Another object is to provide a fluid power control system and control units for the apparatus including a quick-acting reversing and throttling valve of fool-proof construction and having a unique latch mechanism associated therewith, and a self-contained restrictor unit affording restricted flow of fluid in one direction and relatively free flow of fluid in an opposite direction, said latter unit having an element therein movable in opposite directions and coupled with the rotor shaft so as to effect movement of the latter in opposite directions at different speeds.

Another object is to provide a tool actuating mechanism of a form such that the initial portion of the in-feed movement is pneumatically controlled to counteract or cushion the solenoid effect of the motor stator on the rotor and the latter portion of the in-feed movement is hydraulically controlled with the solenoid effect imposing a further or supplemental control; and wherein the out-feed movement is attained with desired rapidity by the solenoid effect of the stator on the rotor without impedance by the pneumatic or hydraulic controls except toward the latter portion of the out-feed movement at which time the pneumatic control plus the opposition of the flux affords a cushioning action.

Another object is to provide a unique switching mechanism which may be employed with the apparatus for reversing the direction of rotation of the tool-carrying drive shaft upon commencement of the out-feed movement as is necessary in tapping operations, for example.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Referring now to the drawings and first more especially to Figs. 1-6 therein, there is shown therein a main frame structure 1 providing a forwardly extending platform 2 on which an electric drive motor 3 is mounted and a housing 4 at the rear portion of said frame structure containing various operating and control units which are hereinafter described in detail.

Said motor 3 although it may be a D. C. motor or a commutator or slip ring type motor is herein shown as being an induction motor comprising a housing 5 surrounding the stator or primary winding 6 (see Fig. 4) and end bells 7 and 8 having bearings 9 and 10 therein which support a drive shaft 11 for both rotation and axial reciprocation. Said drive shaft 11 has a chuck 12 of any conventional form mounted on the front end thereof and the rotor or secondary winding 14 of the motor fixed intermediate the ends thereof.

The rear end of said shaft extends into housing 4 and is rotatably but axially fixedly connected to the piston rod portion 15 of a piston 16 which is reciprocable in a cylinder 17 attached to said housing.

The rotatable connection between said rod 15 and drive shaft 11 comprises for example a swivel coupling including a collar member 18 attached to the piston rod 15 as by means of a pin 19, and a sleeve member 20 surrounding said collar and axially fixed thereonto as by a snap ring 21, said members forming a chamber between the opposed ends of the drive shaft 11 and the piston rod 15 in which is disposed an axial thrust bearing 22 and also forming a second chamber around said drive shaft 11 in which is disposed a radial thrust bearing 23. Said drive shaft is axially fixed to said swivel coupling so that the piston rod 15 and drive shaft 11 will always move together axially as by means of a snap ring 24 on said shaft engaging the rear face of the inner race of bearing 23. Thus, it is apparent that any axial movement of the piston 16 in said cylinder 17 will effect a corresponding axial movement of said drive shaft 11.

In the form of the invention illustrated, the in-feed and out-feed movements of drive shaft 11 through said piston 16 are successively aided by and opposed by the solenoid effect of the stator 6 on the rotor 14. The control units for desirably controlling the speeds of such in-feed and out-feed movements and for determining the limit of the in-feed will now be described in detail.

Figure 1:
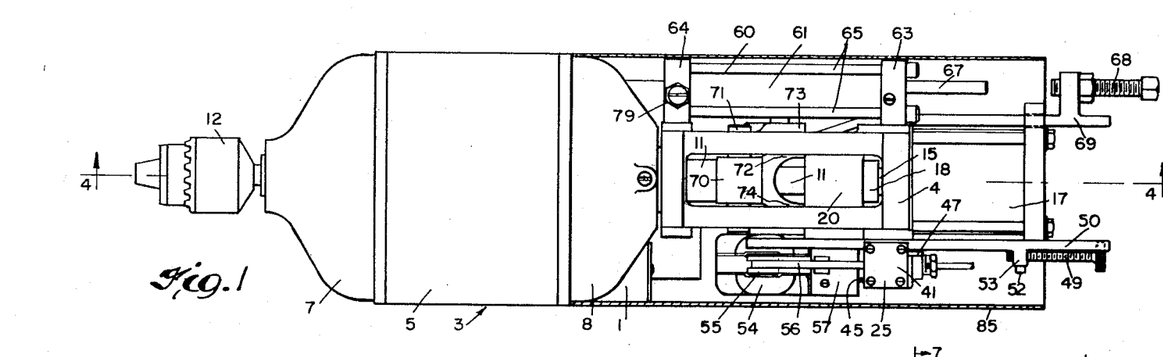
Fig. 1 is a top plan view of one embodiment of this invention with the hood at the rear portion broken away to illustrate the parts thereunder.
Figure 2:
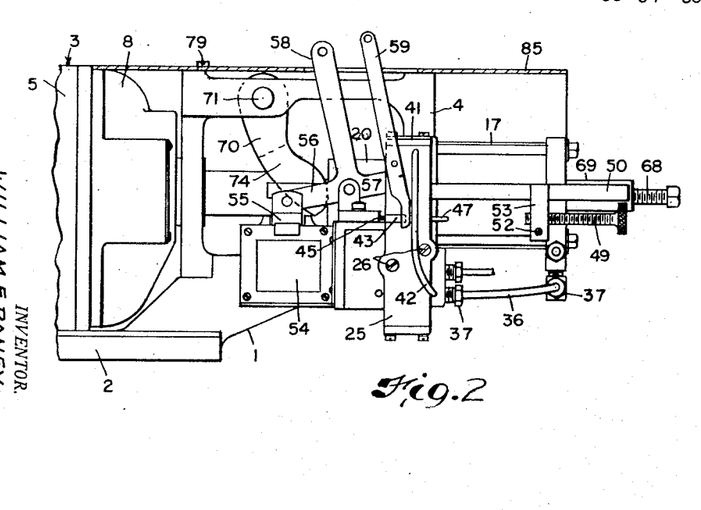
Fig. 2 is a side elevation view of the rear portion of the apparatus, here again the hood being broken away to more clearly illustrate the various component parts.
Figure 3:
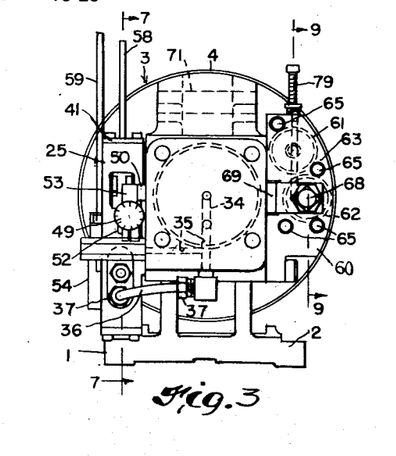
Fig. 3 is a rear elevation view as viewed from the right-hand end of Fig. 1.
Figures 4, 5, 7, 9:
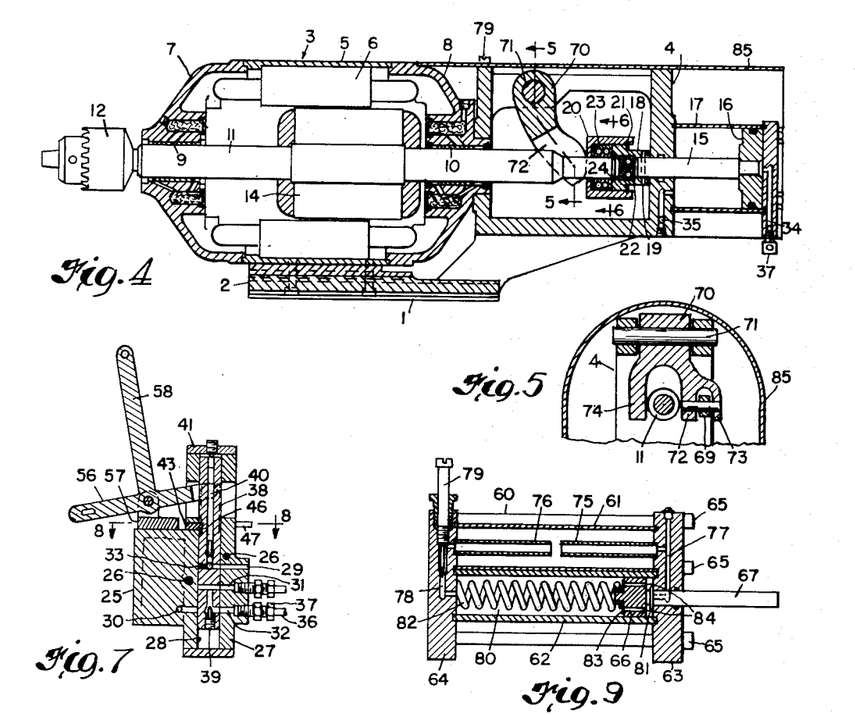
Fig. 4 is a cross-section view taken substantially along the line 4—4, Fig. 1.
Figs. 5 and 6 are transverse cross-section views of the apparatus taken substantially along the lines 5—5 and 6—6 respectively of Fig. 4.
Fig. 7 is a cross-section view of a reversing and throttling valve on the apparatus taken substantially along the line 7—7, Fig. 3.
Fig. 9 is a cross-section view of a hydraulic restrictor unit on the apparatus taken substantially along the line 9—9, Fig. 3.

The pneumatic valve 25 which controls the supply of air under pressure alternately to opposite ends of cylinder 17 (to thus control the reciprocation of the piston 16 therein) is mounted on one side of housing 4 as by screws 26 and comprises as best shown in Fig. 7 a body 27 formed with a bore 28 therethrough intersected by a plurality of axially spaced lateral ports of which the ports 29 and 30 are exhaust ports, the port 31 is an air pressure inlet port, and the ports 32 and 33 respectively communicate with the passages 34 and 35 at the opposite ends of cylinder 17, the former being connected to the passage 34 at the head end of said cylinder by means of a length of tube 36 connected to valve body 27 and cylinder 17 as by conventional fittings 37 and the latter registering with the passage 35 at the rod end of said cylinder.

Reciprocable within said valve body bore 28 is a valve plunger or spool member 38 provided with several ports disposed radially and axially thereof and arranged so that in one position of said plunger, viz. that shown in Fig. 7, air from the inlet port 31 will flow through the plunger ports to the body port 32 and through the tube 36 to the head end of cylinder 17 and the air from the rod end of said cylinder will flow through the port 33 in the body and thence through a port in said plunger and out through the exhaust port 29 in said body. A needle valve 39 is mounted in said plunger 38 and is adjustable so as to desirably control the rate of flow of air into the head end of cylinder 17 and thereby control the in-feed of the drive shaft opposing the solenoid effect of the stator 6 on the rotor 14.

In the other position of said plunger 38, viz. the plunger moved downward from the position shown in Fig. 7, air under pressure in the inlet port 31 flows through ports in the plunger to the port 33 in the valve body and into the passage 35 leading into the rod end of cylinder 17 and the exhaust from the head end of said cylinder flows through tube 36, port 32 in the body, and ports in said plunger, and will be exhausted through the port 30 in the body. Another needle valve 40 is adjustably threaded into said plunger to effect any desired rate of out-feed movement of piston 16 and drive shaft 11.

In order to attain rapid reversal of said valve 25 and thereby attain accurate limiting of the in-feed movement of the drive shaft 11, the upper end of the bore 28 in said valve body 27 is closed as by a cap 41 to form a pressure chamber with the upper end of the plunger 38, air under pressure being supplied to such chamber from the port 32 by way of the tube 42 (see Fig. 2) during the entire in-feed movement of piston 16 and drive shaft 11 whereupon the tripping of the latch mechanism now to be described will effect sure and rapid downward movement of said plunger 38 to direct air pressure to the rod end of cylinder 17 to promptly commence the out-feed movement.

Figure 8:
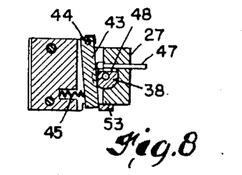
Fig. 8 is a cross-section view taken substantially along the line 8—8, Fig. 7, illustrating the latching mechanism on said valve.

Said latch mechanism comprises a latch member 43 pivotally connected as at 44, Fig. 8, to valve body 27 and normally urged by a spring 45 engaging the outer end portion of said latch member 43 into engagement with a transverse notch 46 formed in the side of said plunger 38. Said latch member 43 is adapted to be shifted out of engagement with such notch 46, to permit air under pressure acting on the top of the plunger to urge the plunger downwardly, by means of a pin 47 which is slidably mounted in body 27 and which projects laterally therefrom, said pin preferably being disposed alongside a flattened portion 48 of the plunger for permitting axial movement of the plunger and precluding rotation thereof in the valve body.

Figure 6:
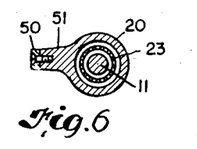

Actuation of said pin 47 is effected by engagement therewith by the adjusting screw 49 which is threaded into a slide bar 50 mounted for movement along a path parallel to the axis of drive shaft 11 and so moved by reason of the inner end of said bar being connected to a lug 51 formed on the sleeve member 20 (see Fig. 6). Said body 27 is formed with a slot in which the bar 50 is slide-guided. The outer face of said adjusting screw 49 is provided with circumferentially spaced calibrations as shown which register with the lower edge of said slide bar 50 so that the position of the end of screw 49 relative to the end of pin 47 may be accurately set. If desired, said slide bar 50 may, in addition, be provided with a scale therealong to indicate the distance between the end of the pin 47 and the end of the screw 49. Locking of screw 49 in adjusted position is effected as by tightening of screw 52 which draws together the legs of the split arm 53 into frictional engagement with said screw 49.

As now apparent, the in-feed movement of drive shaft 11 will be interrupted upon the engagement of screw 49 with pin 47 and the consequent disengagement of latch member 43 from notch 46 in plunger 38 whereupon said plunger will immediately be shifted to a position switching the air pressure from the head end of cylinder 17 to the rod end and thereby commence the out-feed movement of said drive shaft together with the assistance of the motor field flux drawing the rotor 14 toward a neutral axial position.

Resetting of plunger 38 for effecting subsequent in-feed movement in effected by energizing a solenoid 54 which has its core or plunger 55 connected to one end of a lever 56 which is pivotally connected between its ends to a bracket 57 on valve body 27 and which has its other end engaging the valve plunger 38. Said lever 56 is further provided with an arm 58 which enables manual resetting as by suitable linkage mechanism (not shown) or automatic resetting as by a cam (not shown) carried by the slide bar 50 or drive shaft 11. Release of the latch member 43 may also be effected by a lever 59 pivotally mounted on valve body 27 and engaged with the free end of said latch member.

Mounted on the other side of housing 4 is a self-contained one-way hydraulic restrictor unit 60 preferably comprising a pair of parallel tubular members 61 and 62 clamped between heads 63 and 64 at opposite ends by tie bolts 65, the lower tubular member 62 having a differential piston 66 reciprocable therein with its piston rod 67 extending rearwardly in a direction parallel to the axis of drive shaft 11 and adapted to be engaged by the end of an adjusting screw 68 carried on a slide member 69 which is adapted to be moved axially in accordance with the movement of drive shaft 11 by means of a yoke 70 pivotally supported on housing 4 by a pin 71 and provided with arms 72 and 73 between which arms said slide 69 is pivotally connected, and with another arm 74 which together with arm 72 are engaged by the juxtaposed end face of sleeve member 20. The head of cylinder 17 has a slot formed in the side thereof through which the slide 69 loosely extends, such loose fit permitting the movement of the end of said slide which is connected to yoke 70 along an arcuate path.

The upper tubular member 61 preferably has a pair of coaxially disposed tubes 75 and 76 therein with their inner opposed ends spaced apart a slight distance. Said heads 63 and 64 at the opposite ends of said tubular members 61 and 62 are provided with passages 77 and 78 respectively, affording communication between the opposite ends of said tubular members 61 and 62, the latter passage 78 having a needle valve 79 or like restrictor valve for desirably adjusting the rate of flow of fluid from within the lower tubular member 62 into the upper tubular member 61 during the latter part of the in-feed movement, during which screw 68 engages piston rod 67.

With the parts of this restrictor unit 60 in the position shown in Fig. 9, the lower tubular member 62 will be completely filled with fluid whereas the upper tubular member 61 will be filled to a level only somewhat above the open and opposed ends of the tubes 75 and 76 so that said tubes are covered with fluid and so that an air compression chamber is defined in the upper tubular member 61 above the liquid level, such air compression chamber accommodating displacement of the piston rod 67. Thus, when the piston 66 is shifted toward the left as viewed in Fig. 9 the fluid in the space 80 will be forced past the needle valve 79 at a prescribed rate into the upper tubular member 61 and the space 81 behind said piston will be kept filled with fluid flowing through the tube 75 and passage 77. In this way, with a spring 82 compressed between the piston 66 and the head 64, the movement of piston will be primarily controlled by two factors, namely the strength of said spring, and the setting of needle valve 79. As apparent, air pressure is built up in the air chamber in upper tubular member 61 during the movement of piston 66 toward the left. Accordingly, the in-feed of the drive shaft 11 can be suitably controlled with respect to the rate of axial movement and when, for example, a workpiece is being drilled, the breaking through of the drill will not entail the usual rapid movement of the drive shaft whereby burrs and jagged edges on the workpiece are minimized.

Rapid out-feed movement of the drive shaft 11 is effected by the combined action of the spring 82 and by the unseating of a check valve disk 83 carried by the piston 66 which allows fluid to freely pass through the apertures 84 in the piston into the space 80. It is to be noted that the restrictor unit 60 is entirely self-contained and may be operated in any position without impairment of results because the opposed ends of tubes 75 and 76 in any position of the unit will always be beneath the liquid level in tubular member 61 so that air will never become trapped in the lower tubular member 62. Accordingly, as will hereinafter appear the complete mechanism may be mounted in any desired position, that is horizontal as shown or vertical or at any angle between horizontal and vertical.

The frame structure 1 has mounted thereon a hood 85 which covers the housing 4 and the aforedescribed units thereon.

Having thus described one embodiment of this invention, reference will now be made to the general operation thereof.

With the needle valves 39, 40 and 79 predeterminately adjusted, with the plunger 38 in its lower position in valve body 27 and with the adjusting screws 49 and 68 desirably set, air under pressure at port 31 of valve 25 will hold the drive shaft 11 with the tool carried thereon in a retracted position relative to a workpiece to be operated upon. By energizing the motor 3 and the solenoid 54, the plunger 38 will be raised and thereby latched to direct air under pressure to the head end of cylinder 17 at a desired rate through the needle valve 39. During the initial portion of the in-feed movement the solenoid effect of the stator 6 on the rotor 14 will tend to rapidly force the tool on said drive shaft into engagement with the workpiece but the controlled air flow into the head end of cylinder 17 will desirably retard such movement whereby the tool will engage the workpiece without undue shock. After the tool engages the workpiece the in-feed is opposed by the motor flux on the rotor 14 and regulated by the restrictor unit 60 in the manner aforesaid, the screw 68 on the slide 69 having now engaged the end of the piston rod 67. The in-feed movement continues to a definite point as determined by the engagement of the screw 49 on slide bar 50 with pin 47, which pin when moved, disengages the latch member 43 from the valve plunger 38.

With the latch mechanism so released, air pressure on the top end of plunger 38 rapidly forces the plunger downwardly to reverse the air pressure in cylinder 17 to thus commence the out-feed movement. At this time, the out-feed movement occurs with desired rapidity and sureness by the combined actions of the solenoid effect of the motor flux on the rotor 14, the effect of the spring 82 on the piston 66, the effect of the compressed air in said restrictor unit, and the essential lack of fluid restriction in said restrictor unit 60. The speed of out-feed is controlled by the needle valve 40 which regulates the air flow to the rod end of cylinder 17. It is to be noted that the latter portion of the out-feed movement is cushioned by the solenoid effect of the stator 6 on rotor 14, the screw 68 having already disengaged from piston rod 67. The apparatus is retained in a detracted position and the plunger 38 is again raised and latched by the energization of the solenoid 54 or by the operation of lever 58. As previously indicated, the valve plunger 38 may be released from latched position by operating lever 59 instead of pin 47.

Figure 10:
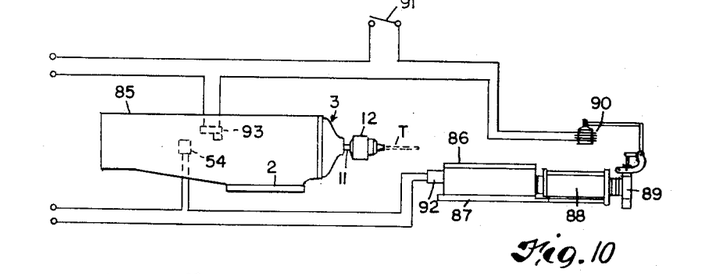
Fig. 10 is a schematic wiring diagram of the mechanism constituting the present invention in association with an indexing device for accomplishing automatic sequential and continuous operation.

In Fig. 10 there is shown a wiring diagram which enables operation of the mechanism continuously and in predetermined relation with a rotary indexing device, said device comprising a rotary table 86 on a support 87, said table being indexed as by a pneumatic cylinder 88 which is controlled by a valve 89 operated upon energization of a solenoid 90. Upon closing of the main switch 91 said solenoid 90 is energized to open the valve for admitting air under pressure into said cylinder 88 to cause rotation of the table 86. The rotation of the table to a predetermined position closes the limit switch 92 which energizes the solenoid 54 on the tool actuating mechanism. This starts the in-feed movement of the drive shaft 11 and tool T adapted to be held in chuck 12, whereupon limit switch 93 is opened to deenergize the solenoid 90 thus permitting the air cylinder 88 to return to its original position or move to the next position opening switch 92 and deenergizing solenoid 54 during the out-feed movement of the drive shaft 11. During the in-feed stroke, the tool T engages a workpiece on table 86, such in-feed continuing until the valve 25 is operated by the releasing of the latch mechanism associated therewith. As the drive shaft 11 retracts, the limit switch 93 is closed and the cycle is repeated, so long as the main switch 91 remains closed.

As evident, several operations may be successively performed on a single workpiece mounted on table 86 or if desired several workpieces may be mounted on said table. Moreover, several tool actuating mechanisms of the character described with the same or different tools thereon may be arranged radially or otherwise around the table 86 or directed upwardly or downwardly at angles whereby to successively operate upon the workpieces on said table. For example, one unit may drill a hole in the workpiece at the first station, another unit may counterbore such hole at the next station, and still other units may countersink or chamfer such hole and perform reaming, threading, or other operations on the workpiece or workpieces. Thus, there is provided a versatile machine tool of simple, economical construction which is operative to perform a multitude of operations on workpieces with but a single chucking of the workpieces on an indexable table.

As a specific example, in the machining of globe valve bodies it is necessary to bore and thread the ports on the opposite ends of the body and to bore and thread the lateral opening in the body which receives the valve bonnet and stem mechanism. Presently such machining requires three chucking operations of the workpiece whereas with the present apparatus several of the compact and light-weight units may be mounted anywhere around the indexing table to enable successive or simultaneous performance of these operations.

Figure 11:
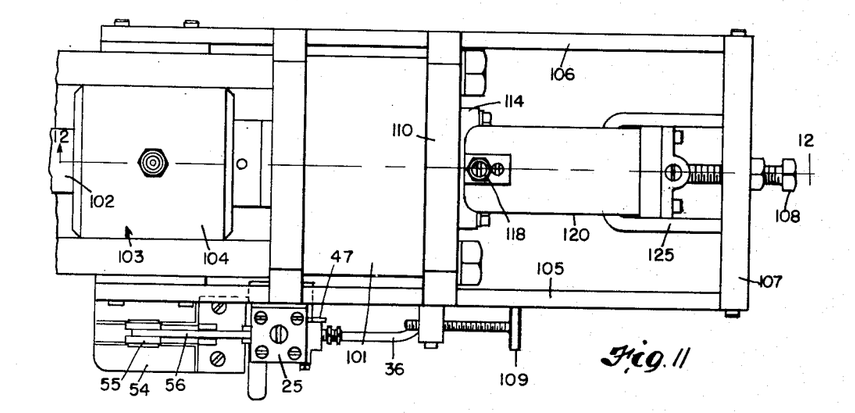
Fig. 11 is a top plan view of the rear portion of a modification.
Figure 12:
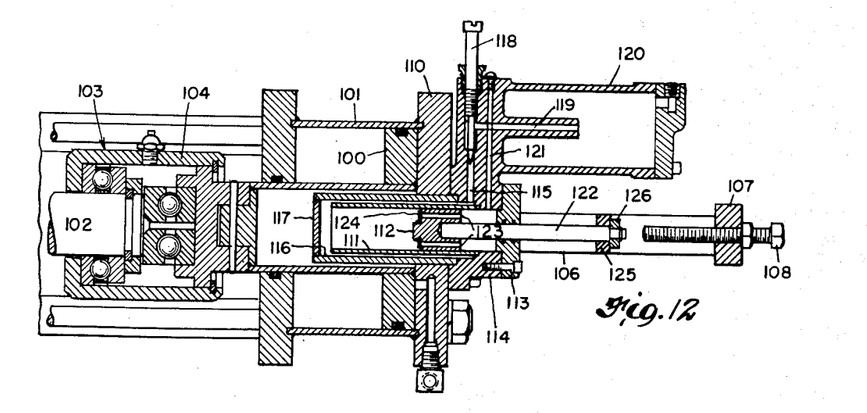
Fig. 12 is a cross-section view taken substantially along the line 12—12, Fig. 11.

Referring now to the modification illustrated in Figs. 11 and 12, which differs from the embodiment illustrated in Figs. 1–4 principally in the location, design, and mode of actuation of the restrictor unit, the same comprises a piston 100 reciprocable in a cylinder 101 at the rear end of the apparatus and having a rotatable but axially fixed connection with the drive shaft 102 through the intermediary of the swivel coupling 103, said coupling being generally similar in construction to the previously described coupling 20, and said drive shaft 102 corresponding with the drive shaft 11 and having mounted thereon a rotor (not shown) which bears the same relation to an electric motor stator as does the rotor 14 to the stator 6 in Fig. 4.

Connected to opposite sides of the coupling sleeve 104 and extending rearwardly therefrom parallel to the axis of piston 100 and drive shaft 102 are a pair of rods 105 and 106 connected together at their ends rearwardly of the cylinder 101 as by a cross-piece 107 which carries an adjustable screw 108 adapted to engage the restrictor unit to be presently described. The rod 105 has thereon an adjustable screw 109 adapted for engagement with the latch release pin 47 of the previously described air control valve 25.

The restrictor unit as illustrated in Figs. 11 and 12 is fastened to the head 110 and preferably extends into the cylinder 101 and into the open end of the piston 100. Said unit comprises an inner tubular member or cylinder 111 in which a piston 112 is reciprocable, one end of said cylinder being closed as by a plug 113 bolted onto the body 114 to which said cylinder is secured and the other end being open and communicating with a passage 115 in the body by way of the annular space formed by an outer tubular member 116 also fastened to body 114 and having its front closed end 117 spaced from the open end of the member 111.

Located within passage 115 is an adjustable needle valve 118 which desirably controls the rate of flow of fluid, preferably liquid, from the left side of the piston 112 during movement of the piston toward the left, and through the duct 119 into a closed reservoir 120. Said duct 119 is preferably disposed coaxially of the reservoir and extends substantially to the middle of the length thereof whereby to possess the features of the restrictor unit of Fig. 9 when the unit is filled with fluid to a level at least covering the open end of the duct when the piston 112 is at the extreme right position. Air will be trapped in the remaining space in said reservoir.

Another passage 121 in the body affords communication between the duct 119 and the rod end of piston 112, the piston rod 122 extending through the plug 113 and adapted to be engaged by the screw 108. Said piston 112 is provided with a plurality of openings 123 axially therethrough and a check valve disc 124 on said piston is adapted to close such openings upon movement of the piston toward the left and to open such openings upon movement of the piston toward the right.

The operation of the Figs. 11 and 12 modification is as follows.

During the movement of the piston 100 toward the left and thus the drive shaft 102 in the same direction (in-feed movement of the tool adapted to be mounted on said shaft), the swivel coupling 103 will similarly move to cause the screw 108 to engage the end of the piston rod 122 and thereby cause the piston 112 to move in the member 111, such movement of the piston 112 setting up a desired resistance to continued movement of the drive shaft in accordance with the setting of the needle valve 118. The excess fluid flows through duct 119 into the closed reservoir 120, compressing the air therein.

Thereafter the screw 109 engages the latch release pin 47 of the air control valve 25 to cause reversing of the pressure of the motivating fluid, preferably air, in the cylinder 101 to initiate the out-feed movement of the drive shaft 102 and tool carried thereby. During the out-feed movement, the piston 112 is moved toward the right and the check valve disc 124 will unseat to allow fluid to flow through the openings 123 from the rod end into the head end of cylinder 111, such movement of the piston being effected as by a member 125 carried by the cross-piece 107 and provided with an eye slidable on the piston rod 122 in one direction and engageable with the collar 126 on said piston rod in the other direction upon take-up of the lost motion between the end of said piston rod and the end of screw 108. The settings of the screws 108 and 109 with respect to the restrictor unit and to the control valve respectively and relative to the motor stator and rotor will preferably be the same as in Figs. 1–4 whereby the stator flux will successively aid and oppose the in-feed and out-feed movements of the drive shaft.

Figure 13:
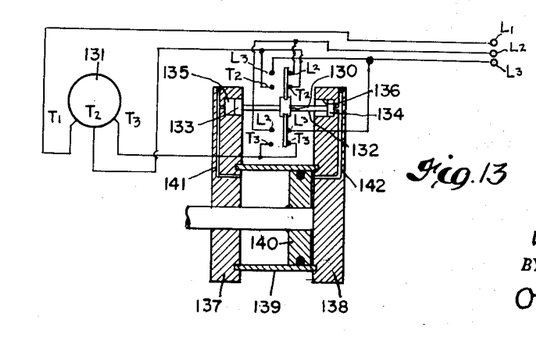
Fig. 13 is a cross-section view of the rear portion of the apparatus illustrating a reversing switch in association with the drive shaft reciprocating means.

A further improvement having utility in connection with an apparatus used for tapping and like operations wherein it is necessary to reverse the direction of rotation of the tool at the end of the in-feed movement is the reversing switch disclosed in Fig. 13. Said switch comprises a movable contactor 130 adapted in one position to bridge the contacts L2—T2 and L3—T3 of a power supply and the reversible motor 131 and in another position to bridge the contacts L3—T2 and L2—T3 and thereby cause operation of the motor first in one direction and then in the opposite direction. Said contactor 130 is carried on a rod 132 provided with pistons 133 and 134 respectively reciprocable in the cylinders 135 and 136 formed as in the heads 137 and 138 of the cylinder 139 in which latter cylinder the main drive shaft piston 140 is reciprocable. Said heads 137 and 138 are formed with passages 141 and 142 leading from the opposite ends of cylinder 139 into cylinders 135 and 136 respectively. It is to be understood that the piston 140 is connected to a drive shaft as by a swivel coupling such as that previously described.

Accordingly, when fluid under pressure is admitted into cylinder 139 to urge the piston 140 therein toward the left to thus commence the in-feed movement of the drive shaft (not shown) connected with said piston, the fluid will at the same time enter cylinder 136 and urge the piston 134 together with the rod 132 and contactor 130 toward the left to bridge the contacts L3—T2 and L2—T3 of the motor 131, whereby said motor will run in one direction to correspondingly rotate the drive shaft while said shaft is being moved axially by the piston 140.

When the end of the in-feed stroke is reached, fluid under pressure will be admitted into the rod end of the cylinder 139 in a manner already described to commence the out-feed movement. In the case where the drive shaft has a tap or like tool thereon which must be rotated in reverse to effect withdrawal of the tool from a workpiece, the motor 131 must be reversed in order to drive said shaft in a reverse direction during the out-feed movement. This reversal of the motor is effected by the fluid under pressure passing through the passage 141 and acting on the piston 133 to urge the latter together with the rod 132 and contactor 130 toward the right, whereupon the contactor 130 bridges contacts L2—T2 and L3—T3.

Although said reversing switch is herein particularly illustrated on a tool actuating mechanism for reversing an electric motor, it obviously has a multitude of other uses wherein the opposite movements of a contactor by fluid under pressure will effect desired making and breaking of contacts.

The mechanisms herein disclosed are, of course, to be regarded as merely exemplary and may be variously modified within the spirit of the invention. One of the primary features of this invention is the provision of a machine tool having a reciprocating and rotating drive shaft which constitutes the rotor shaft of an electric drive motor and which is reciprocated from one side to the other of the neutral axial position to which the magnetic field generated in the motor tends to draw the rotor. Other features are the provision of improved control units for such machine tool by means of which the reciprocation and rotation of the drive shaft may be accurately controlled. In this connection it has been found that the point of stopping of the in-feed movement of the drive shaft can be controlled within .0002" or less, which is more than sufficiently accurate for most operations.

Other modes of applying the principle of the invention may be employed, change being made as regards the details described, provided the features stated in any of the following claims, or the equivalent of such, be employed.

I therefore particularly point out and distinctly claim as my invention:

1. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, and actuating means operative to axially shift said rotor from one side to the other of such neutral axial position first predeterminedly retarding drawing of the rotor toward neutral position by the magnetic field and then predeterminedly overcoming the magnetic field opposition to movement of the rotor from neutral position and thus correspondingly axially shift said drive shaft.

2. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, and actuating means operative to axially reciprocate said rotor first from one side to the other of such neutral axial position and then vice versa first predeterminedly retarding drawing of the rotor toward neutral position by the magnetic field and then predeterminedly overcoming the magnetic field opposition to movement of the rotor from neutral position, and thus correspondingly axially reciprocate said drive shaft.

3. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, and a power device having a movable element operatively connected to said rotor, said power device being arranged to predeterminedly retard axial movement of said rotor by the magnetic field generated in said motor from one side of such neutral axial position to such position and to continue axial movement of said rotor from such position to the other side of such position in opposition to the magnetic field opposing such continued axial movement.

4. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, and means for thus operating said valve upon movement of said drive shaft to a preselected position.

5. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, a latch mechanism holding said valve in a position to cause said element to move in one direction, and means for releasing said latch mechanism upon movement of said element, and thus said rotor and drive shaft, to a preselected position in such one direction.

6. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position, first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, and a throttling valve controlling the rate of flow of fluid to said motor whereby to predeterminedly control the speed of movement of said element, and thus said rotor and drive shaft.

7. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position, first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, and a restrictor unit predeterminedly retarding movement of said drive shaft in one direction only.

8. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, and a restrictor unit predeterminedly retarding movement of said drive shaft in one direction only, said restrictor unit being arranged to supplement the influence of the magnetic field generated in said electric drive motor which opposes movement of the rotor away from such neutral axial position.

9. In combination, an electric drive motor having a rotor and a drive shaft fixed to said rotor, said rotor and drive shaft being supported in said drive motor for rotation about the central axis of said shaft and for axial reciprocation from one side to the other of a neutral axial position to which the magnetic field generated in said motor tends to draw said rotor, said drive shaft having means thereon for mounting a rotary cutting tool for infeed and outfeed movement relative to a work-piece, a piston and cylinder assemblage mounted on one end of said drive motor having the piston thereof coaxial with said drive shaft and rotatably but axially fixedly connected to one end of said drive shaft, a reversing valve connected to said assemblage and to a source of fluid under pressure and including a movable valve member selectively operative to cause the piston to move in one direction or the other, and thus similarly move said rotor and drive shaft from one side to the other of such neutral axial position, and valve operating means mounted for movement in unison with said piston, drive shaft, and rotor operative to engage and move said valve member to reverse said valve upon movement of said rotor and drive shaft in one direction to a predetermined position beyond such neutral axial position whereby movement of said rotor and drive shaft in an opposite direction toward such neutral position is effected by the combined action of the magnetic field generated in the drive motor on the rotor and the fluid under pressure acting on said piston and cylinder assemblage.

10. In combination, an electric drive motor having a rotor and a drive shaft fixed to said rotor, said rotor and drive shaft being supported in said drive motor for rotation about the central axis of said shaft and for axial reciprocation from one side to the other of a neutral axial position to which the magnetic field generated in said motor tends to draw said rotor, said drive shaft having means thereon for mounting a rotary cutting tool for infeed and outfeed movement relative to a work-piece, a piston and cylinder assemblage mounted on one end of said drive motor having the piston thereof coaxial with said drive shaft and rotatably but axially fixedly connected to one end of said drive shaft, a reversing valve connected to said assemblage and to a source of fluid under pressure and including a movable valve member selectively operative to cause the piston to move in one direction or the other, and thus similarly move said rotor and drive shaft from one side to the other of such neutral axial position, and valve operating means mounted for movement in unison with said piston, drive shaft, and rotor operative to engage and move said valve member to reverse said valve upon movement of said rotor and drive shaft in one direction to a predetermined position beyond such neutral axial position whereby movement of said rotor and drive shaft in an opposite direction toward such neutral position is effected by the combined action of the magnetic field generated in the drive motor on the rotor and the fluid under pressure acting on said piston and cylinder assemblage, and a throttling valve operatively associated with said assemblage for controlling the rate of flow of fluid under pressure to said assemblage whereby to predeterminedly control the speed of movement of said piston, and thus of said rotor and drive shaft, in one direction.

11. In combination, an electric drive motor having a rotor and a drive shaft fixed to said rotor, said rotor and drive shaft being supported in said drive motor for rotation about the central axis of said shaft and for axial reciprocation from one side to the other of a neutral axial position to which the magnetic field generated in said motor tends to draw said rotor, said drive shaft having means thereon for mounting a rotary cutting tool for infeed and outfeed movement relative to a work-piece, a piston and cylinder assemblage mounted on one end of said drive motor having the piston thereof coaxial with said drive shaft and rotatably but axially fixedly connected to one end of said drive shaft, a reversing valve connected to said assemblage and to a source of fluid under pressure and including a movable valve member selectively operative to cause the piston to move in one direction or the other, and thus similarly move said rotor and drive shaft from one side to the other of such neutral axial position, means admitting fluid under pressure to act on said valve member constantly tending to shift said valve member from one position to another, latch mechanism holding said valve in such one position, and latch releasing means mounted for movement in unison with said piston, drive shaft, and rotor and operative to release said latch mechanism upon predetermined movement of said rotor and drive shaft in one direction beyond such neutral axial position whereby said valve member is quickly shifted by fluid under pressure acting thereon to such another position by said fluid pressure means to cause said piston, and thus said rotor and drive shaft, to move in an opposite direction with the assistance of the magnetic field generated in said drive motor which tends to draw said rotor toward such neutral position.

12. In combination, an electric drive motor having a rotor and a drive shaft fixed to said rotor, said rotor and drive shaft being supported in said drive motor for rotation about the central axis of said shaft and for axial reciprocation from one side to the other of a neutral axial position to which the magnetic field generated in said motor tends to draw said rotor, said drive shaft having means thereon for mounting a rotary cutting tool for infeed and outfeed movement relative to a work-piece, a piston and cylinder assemblage mounted on one end of said drive motor having the piston thereof coaxial with said drive shaft and rotatably but axially fixedly connected to one end of said drive shaft, a reversing valve connected to said assemblage and to a source of fluid under pressure and including a movable valve member selectively operative to cause the piston to move in one direction or the other, and thus similarly move said rotor and drive shaft from one side to the other of such neutral axial position, valve operating means mounted for movement in unison with said piston, drive shaft, and rotor operative to engage and move said valve member to reverse said valve upon movement of said rotor and drive shaft in one direction to a predetermined position beyond such neutral axial position whereby movement of said rotor and drive shaft in an opposite direction toward such neutral position is effected by the combined action of the magnetic field generated in the drive motor on the rotor and the fluid under pressure acting on said piston and cylinder assemblage, a fluid restrictor unit including an element which is reciprocable along a path parallel to the axis of said drive shaft and which offers greater resistance to movement in one direction than the other, and means moving in accordance with the movement of said piston, rotor, and drive shaft and engaging said element to move the latter in such one direction during movement of said rotor away from such neutral axial position.

13. In combination, a reversible drive motor having a rotor supported therein for rotation about its central axis and for axial movement relative to the neutral axial position to which the magnetic field generated in said motor tends to draw said rotor, a drive shaft driven by said rotor and movable axially therewith, fluid pressure actuating means including a movable element operative to axially reciprocate said rotor and thus said drive shaft, and a fluid pressure actuated switch for operating said motor and causing said rotor to rotate in opposite directions responsive to movement of said rotor and drive shaft axially in opposite directions, said switch comprising spaced contacts between said motor and an electric power source, a contactor rod movable in opposite directions between said contacts into and out of engagement therewith, a piston carried at each end of said contactor rod, and a cylinder for each piston formed with a passage for fluid under pressure, said cylinders being connected in parallel with said fluid pressure actuating means.

14. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position first predeterminedly retarding drawing of the motor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, means tending to shift said valve from one position to another, a latch mechanism holding said valve in such one position to cause said element to move in one direction, and means for releasing said latch mechanism upon movement of said element, and thus said rotor and drive shaft, to a preselected position in such one direction whereby said valve is quickly shifted to such another position to cause said element to move in such other direction.

15. In combination, an electric drive motor having a rotor supported therein for rotation about its central axis and for axial movement from one side to the other of a neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, a reversible fluid power operated motor having an element movable in opposite directions, said element being operatively connected to said rotor for reciprocating said rotor, and thus said drive shaft, from one side to the other of such neutral axial position, first predeterminedly retarding drawing of the rotor toward neutral position by the magnetic field and then predeterminedly overcoming the magnetic field opposition to movement of the rotor from neutral position, a reversing valve associated with said fluid motor and a source of fluid under pressure and selectively operable to cause said element to be moved in one direction or the other, and a restrictor unit predeterminedly retarding movement of said drive shaft in one direction only and assisting movement of said drive shaft in the other direction, said restrictor unit being arranged to supplement the influence of the magnetic field generated in said electric drive motor which opposes movement of the rotor away from such neutral axial position.

16. In combination, a reversible drive motor having a rotor supported therein for rotation about its central axis and for axial movement relative to the neutral axial position to which the magnetic field generated in said motor tends to draw said rotor, a drive shaft driven by said rotor and movable axially therewith and having means thereon for mounting a rotary cutting tool for infeed and outfeed movement relative to a work-piece, fluid pressure actuating means including a movable element operative to axially reciprocate said rotor and thus said drive shaft, and a fluid pressure actuated switch for operating said motor and causing said rotor to rotate in opposite directions responsive to movement of said rotor and drive shaft axially in opposite directions, said switch comprising spaced contacts between said motor and an electric power source, a fluid motor including a contactor constituting the movable element of said fluid motor and movable in opposite directions between said contacts into and out of engagement therewith, said fluid motor being connected in parallel with said fluid pressure actuating means.

WILLIAM E. RANEY.

References Cited in the file of this patent

UNITED STATES PATENTS

| Number | Name | Date |
|---|---|---|
| 644,591 | Freeman | Mar. 6, 1900 |
| 725,456 | Lemp | Apr. 14, 1903 |
| 1,072,822 | Cevasco et al. | Sept. 9, 1913 |
| 1,352,646 | Baltzley | Sept. 14, 1920 |
| 1,690,103 | Clark | Nov. 6, 1928 |
| 2,181,873 | Cregar | Dec. 5, 1939 |
| 2,355,558 | Raney | Aug. 8, 1944 |
| 2,381,039 | Churchill | Aug. 7, 1945 |
| 2,488,992 | Taylor | Nov. 22, 1949 |
| 2,541,306 | Taylor | Feb. 13, 1951 |

FOREIGN PATENTS

| Number | Country | Date |
|---|---|---|
| 198,473 | Great Britain | June 7, 1923 |